Jan. 26, 1965 J. ERRITT 3,166,855
SPIRIT LEVEL
Filed Oct. 21, 1960
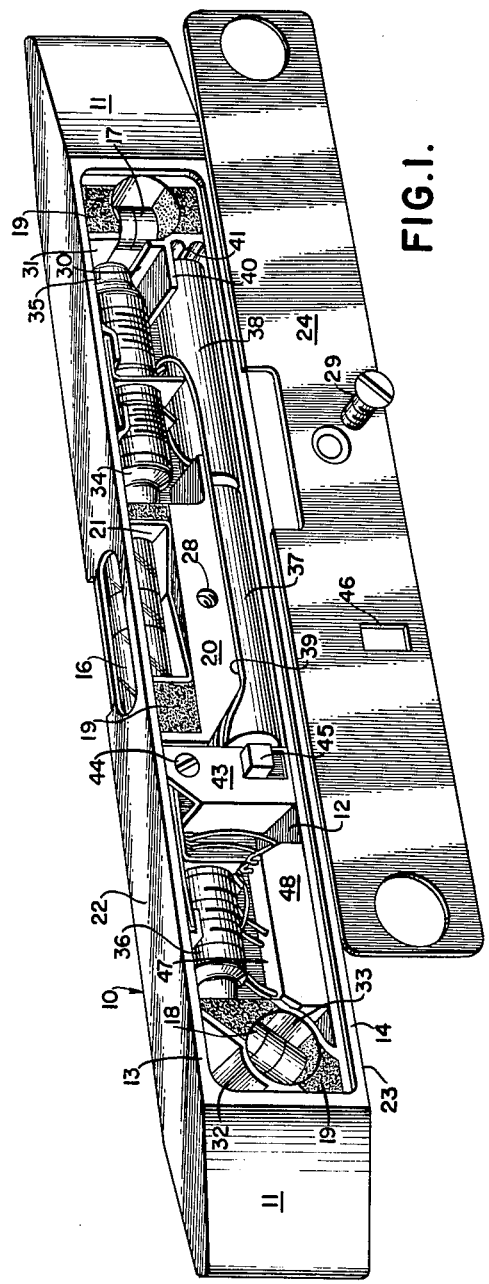
INVENTOR
Joseph Erritt
BY *Gordon W. Auescher*
ATTORNEY

United States Patent Office 3,166,855
Patented Jan. 26, 1965

3,166,855
SPIRIT LEVEL
Joseph Erritt, Kalamazoo, Mich., assignor, by mesne assignments, to Mrs. Joseph Erritt (Ellen Belle Erritt), Kalamazoo, Mich.
Filed Oct. 21, 1960, Ser. No. 64,002
9 Claims. (Cl. 33—211)

This invention relates to a spirit level in which, through the use of a multi-circuit mercury switch, each spirit level indicating tube is automatically illuminated as it approaches its "level" position.

In normal use, a spirit level is used to make intermittent level determinations as work progresses. The user of the spirit level of this invention may switch the circuit "on" (that is, place it in an operative state) when he begins work, and let it remain on. The lights will not turn on until a reading is to be made, and then only the one light which illumintes the appropriate indicating tube will light. Between readings, the level may be laid down on its side and the light will remain off.

A separate, battery powered, electric light bulb provides illumination for each of the spirit level tubes of the invention. The multi-circuit mercury switch provides a pair of electrical contacts for each light bulb; each pair of contacts being connected in series with its corresponding light bulb and the battery. The mercury switch is so positioned in the spirit level that, when the level is placed with one of its spirit level tubes level or nearly so, the proper pair of mercury switch contacts will be electrically connected by the pool of mercury, thus completing the electrical circuit through the corresponding light bulb and causing the bulb to illuminate the spirit level tube. The mercury switch is so constructed that when the level is laid on its side, the mercury pool cannot connect the two contacts of any contact pair.

One embodiment of the illuminated spirit level of the invention is shown in the drawings in which:

FIG. 1 is a perspective view with the side plate shown removed;

FIG. 2 is an elevation, largely in section;

FIG. 3 is a schematic diagram of the electrical circuit, and

FIG. 4 is an enlarged fragmentary section taken substantially along the line 4—4 of FIG. 2, showing the location of mercury pool 51 when the level is lying on side 15.

The embodiment shown in the drawings has a body 10 of conventional external outline, being generally a rectangular parallelepiped which may have tapered ends 11. That portion of the body 10 extending between the tapered ends 11 is hollow, containing a cavity 12 defined by the two ends 11, the top 13, the bottom 14, a side 15 (being the side away from the viewer in both FIGS. 1 and 2), and a removable side plate 24. The body is preferably constructed from a light weight metal such as aluminum. Various metal webs, preferably cast as an integral part of body 10, extend from the body into the cavity 12 for the purpose of mounting components therein.

The instrument contains three conventional spirit level indicating tubes 16, 17 and 18. Tube 16 is mounted so that its bubble will indicate "level" when the top surface 22 and bottom surface 23 are level; tube 17 will indicate "level" when surfaces 22 and 23 are vertical; and tube 18 will indicate "level" when surfaces 22 and 23 are at an angle of 45° with horizontal. Each tube is mounted at both ends in plaster of Paris 19, which is set into cavities formed between two webs or between a web and a side of body 10. Tube 16 is mounted in the recess formed between web 20 and top 13. In addition to having its ends embedded in plaster of Paris 19, tube 16 is also mounted with the help of metallic spring clip 21. Web 20 also contains the threaded hole 28 which receives the side plate retaining screw 29 for fastening the side plate 24 to the body 10. Tube 17 is mounted in recesses formed between webs 30 and 31 and one end 11. Tube 18 is mounted in the recess formed between webs 32 and 33.

Three lamps, 34, 35 and 36, provide illumination for spirit level tubes 16, 17 and 18 respectively. It is contemplated that in larger embodiments of this invention, the light bulbs may be located further from the spirit level tubes they are to illuminate, and some method of channeling the light from the bulbs to the tubes, such as the use of plastic tubes or rods, may be necessary to secure sufficient illumination.

Two batteries 37 and 38 are mounted in the longitudinal recesses formed between side 39 of web 20 and extension 40 of web 30 and bottom 14 of case 10. Batteries 37 and 38 are confined axially by protuberance 41 of web 30 and spring contact 42.

Manually operated on-off switch 43 is a conventional single pole, single throw, slide switch which is mounted by means of screw 44. Bent spring contact 42 is mounted rigidly to one of the contacts of switch 43. Switch slide button 45 protrudes from the switch 43 and through the corresponding rectangular cutout 46 in side plate 24.

The principal component in the electrical system is multi-circuit mercury switch 47. This switch consists basically of two or more sets of contacts, or contact pairs, which extend into a curved or angled closed channel containing a pool of mercury. The particular mercury switch of this embodiment is fabricated from a solid block of plastic 48 which may be seen most clearly in FIG. 1. The closed channel is made by boring two holes 49 and 50 into plastic block 48, which holes intersect in an obtuse angle. A pool of mercury 51 is then introduced into the channel and the two ends closed off with plugs 52 and 53. Three sets of contacts, or contact pairs, 54, 55 and 56 extend from the exterior of the plastic block down into the closed channel 57, contact pair 54 in the center of the channel and contact pairs 55 and 56 near the ends thereof. The mercury switch 47 may be mounted in the level by any means desired. It may be cemented to the body, as in this embodiment, or it may be attached by suitable screws, etc.

The electrical connection of the various parts is shown in the schematic diagram of FIG. 3. In FIG. 2, all wiring connections are omitted for the sake of clarity, although some wires are shown in FIG. 1. The metallic body 10 of the level provides the electrical connection between the negative pole of the battery and one side of each of the three light bulbs 34, 35 and 36. This is indicated on the schematic diagram of FIG. 3 by attaching a ground 58 to this portion of the circuit. The positive side of the battery goes to one of the two contacts of on-off switch 43 via spring clip 42; the other contact of on-off switch 43 being connected to one contact of each of the three contact pairs 54, 55 and 56. The other contact of each contact pair 54, 55 and 56 is connected to one contact of light bulb 34, 35 and 36 respectively. Thus each contact pair is electrically in series with its corresponding light bulb and batteries 37 and 38. With switch 43 closed, placing the circuit in an operative position, whenever mercury pool 51 envelops any contact pair it completes the electrical circuit and lights the bulb corresponding to that contact pair. The bent or angled channel 57 of mercury switch 47 is so oriented with respect to the surfaces of the level, and the conductor pairs are so placed within the channel, that the conducting mercury pool 51 will envelop the appropriate contact pair and light the particular light corresponding to and illuminating a spirit level tube when that tube is in a nearly "level" position. The configuration of the mercury switch 47 and the location of the electrical contact pairs within it may be seen from the section view of FIGURE 2, and also from the schematic diagram of FIGURE 3. In both FIGS. 2 and 3, the level is shown with spirit level tube 16 in a "level" position, and mercury pool 51 is accordingly connecting the contacts of contact pair 54, which will result in lighting bulb 34. As may be seen from FIGS. 2 and 3, tilting the level so that tubes 17 and 18 become level will cause the mercury pool to envelop contact pairs 55 and 56 respectively. The pool of mercury 51 will envelop any particular contact pair throughout a sufficient range of angular movement so that the indicating tube associated therewith will be illuminated not only at its precisely "level" position, but for a sufficient angle on either side of the "level" position so that the tube and the bubble will be illuminated whenever a normal reading is taken.

The two contacts in each pair are spaced along a line transverse to the longitudinal axis of the level and of the mercury switch channel 57. The contacts of the contact pairs in the schematic diagram of FIG. 3 are shown spaced along the longitudinal axis of mercury switch channel 57, but this is merely for schematic convenience, and is not indicative of the true physical position of the contacts. Because of this contact arrangement, whenever the level is placed upon its side, either on side plate 24 or on the opposite side 15, mercury switch 47 will be at such an attitude that the pool of mercury 51 will not envelop both contacts in any contact pair. This is illustrated in FIG. 4, which shows that, with the level lying on a side, such as 15, the mercury pool 51 will probably not touch even one contact of any contact pair, but will certainly not envelop both. Thus, between intermittent readings, when the level is laid down upon one of its flat sides 15 or 24, the lights will remain off even through the switch 43 is turned "on" so as to place the electrical system in an operative position.

I claim:

1. A spirit level comprising a body having parallel top and bottom surfaces and a lateral side surface normal to said top and bottom surfaces, a plurality of elongated spirit level tubes disposed in cavities in said body and at an angle to each other, each of said tubes having its longitudinal axis in a plane parallel to said side surface, a plurality of electric light bulbs mounted in said body for illuminating said plurality of tubes, each of said bulbs associated with one of said tubes, a battery disposed in said body for energizing said bulbs, a mercury switch mounted in said body and provided with a closed channel, a plurality of pairs of contacts disposed in said channel, each of said pairs of contacts being transversely arranged in said channel and connected in a series circuit with one of said bulbs and with said battery, and a pool of mercury displaceable in said channel, said pairs of contacts being so positioned and the mercury being present in such amount as to envelop only one of said pairs of contacts and complete the circuit when one of said tubes is substantially horizontal and said lateral side surface is substantially vertical, and to open said circuit when said tube is positioned so that it is not substantially horizontal.

2. In a spirit level, the combination of a body having parallel top and bottom surfaces and a lateral side surface normal to said top and bottom surfaces, an elongated spirit level tube disposed in a cavity in said body and having its longitudinal axis in a plane parallel to said lateral side surface, an electric light bulb mounted in said body for illuminating said spirit level tube, a battery disposed in said body for energizing said bulb, a mercury switch mounted in said body and provided with a closed channel, a pair of contacts disposed in said channel and connected in a series circuit with said bulb and said battery, and a pool of mercury displaceable in said channel the pair of contacts being so positioned and the mercury being of such amount as to envelop said pair of contacts and complete the circuit when said tube is substantially horizontal and said lateral side surface is substantially vertical but insufficient to envelop more than one contact of said pair and keep the circuit open when said lateral side surface is substantially horizontal, and to open said circuit when said lateral side surface is substantially vertical but said tube is positioned so that it is not substantially horizontal.

3. A spirit level comprising a body having parallel top and bottom surfaces and a lateral side surface normal to said top and bottom surfaces; first, second, and third elongated spirit level tubes disposed in cavities in said body and at an angle to each other and having their longitudinal axes in a plane parallel to said lateral side surface; first, second, and third electric light bulbs mounted in said body for illuminating respectively said first, second, and third spirit level tubes; a battery disposed in said body for energizing said bulbs; a mercury switch mounted in said body and provided with a closed channel; a first pair of contacts disposed in said channel and connected in a series circuit with said first bulb and said battery; a second pair of contacts disposed in said channel and connected in a series circuit with said second bulb and said battery; a third pair of contacts disposed in said channel and connected in a series circuit with said third bulb and said battery; and a pool of mercury displaceable in said channel, said pairs of contacts being so positioned and the mercury being present in such amount as to envelop only one of said pairs of contacts and complete the circuit when one of said tubes is substantially horizontal and said lateral side surface is substantially vertical but insufficient to envelop more than one contact of the pair when said lateral side surface is substantially horizontal, and to open said circuit when said lateral side surface is substantially vertical but said tube is positioned so that it is not substantially horizontal.

4. The spirit level of claim 2 wherein each of said pairs of contacts is transversely arranged in said channel.

5. The spirit level of claim 2 wherein each of said pairs of contacts is vertically disposed in pendant position so that only the lower tips thereof can be engaged by said mercury.

6. The spirit level of claim 3 wherein each of said pairs of contacts is transversely arranged in said channel.

7. The spirit level of claim 3 wherein each of said pairs of contacts is vertically disposed in pendant position so that only the lower tips thereof can be engaged by said mercury.

8. A spirit level comprising a body having parallel top and bottom surfaces and a lateral side surface normal to said top and bottom surfaces, a plurality of elongated spirit level tubes disposed in cavities in said body and at an angle to each other, each of said tubes having its longitudinal axis in a plane parallel to said side surface, a plurality of electric light bulbs mounted in said body for illuminating said plurality of tubes, each of said bulbs associated with one of said tubes, a battery disposed in said body for energizing said bulbs, a mercury switch mounted in said body and provided with a closed channel, a plurality of pairs of contacts disposed in said channel, each of said pairs of contacts connected in a series circuit with one of said bulbs and with said battery, and a pool of mercury displaceable in said channel, said pairs of contacts being so positioned and the mercury being present in such amount as to envelop only one of said pairs of contacts and complete the circuit when one of said tubes is substantially horizontal and said lateral side surface is substantially vertical, and to open said circuit when said tube is positioned so that it is not substantially horizontal, each of said pairs of contacts being so arranged in said channel that said pool of mercury envelops no more than one contact of the pair when said lateral surface is substantially horizontal.

9. A spirit level comprising a body having parallel top and bottom surfaces and a lateral side surface normal to said top and bottom surfaces, a plurality of elongated spirit level tubes disposed in cavities in said body and at an angle to each other, each of said tubes having its longitudinal axis in a plane parallel to said side surface, a plurality of electric light bulbs mounted in said body for illuminating said plurality of tubes, each of said bulbs associated with one of said tubes, a battery disposed in said body for energizing said bulbs, a mercury switch mounted in said body and provided with a closed channel, a plurality of pairs of contacts disposed in said channel, each of said pairs of contacts connected in a series circuit with one of said bulbs and with said battery, and a pool of mercury displaceable in said channel, said pairs of contacts being so positioned and the mercury being present in such amount as to envelop only one of said pairs of contacts and complete the circuit when one of said tubes is substantially horizontal and said lateral side surface is substantially vertical, and to open said circuit when said tube is positioned so that it is not substantially horizontal, each of said pairs of contacts being vertically disposed in pendant position so that only the lower tips thereof can be engaged by said mercury.

References Cited by the Examiner

UNITED STATES PATENTS

| | | | |
|---|---|---|---|
| 2,338,811 | 1/44 | Hasbrook | 33—206.5 |
| 2,634,509 | 4/53 | Roberts | 33—211 |
| 2,823,367 | 2/58 | Huron | 200—61.47 X |
| 2,944,144 | 7/60 | Naylor | 240—6.44 |

FOREIGN PATENTS 20,476   9/30   Australia.

ISAAC LISANN, *Primary Examiner.*